United States Patent [19]

Mizusawa

[11] 3,970,347
[45] July 20, 1976

[54] FLUID PRESSURE CONTROL DEVICE WITH A FAILURE ALARM FOR A VEHICLE BRAKE SYSTEM

[75] Inventor: Mitsutoyo Mizusawa, Kawanishi, Japan

[73] Assignee: Nisshin Kogyo Kabushiki Kaisha, Ueda, Japan

[22] Filed: Mar. 7, 1975

[21] Appl. No.: 556,536

[30] Foreign Application Priority Data
May 2, 1974    Japan.............................. 49-49386

[52] U.S. Cl.............................. 303/6 C; 303/84 A
[51] Int. Cl.²............................................. B60T 8/26
[58] Field of Search............. 188/349; 303/6 C, 6 R, 303/22 R, 84 A, 84 R

[56] References Cited
UNITED STATES PATENTS

| | | | |
|---|---|---|---|
| 3,450,443 | 6/1969 | Bueler............................. | 188/349 X |
| 3,738,709 | 6/1973 | Stokes................................. | 303/6 C |
| 3,774,974 | 11/1973 | Braun................................. | 303/6 R |

Primary Examiner—Duane A. Reger
Attorney, Agent, or Firm—Haseltine, Lake & Waters

[57] ABSTRACT

A device for a brake system including two independent hydraulic lines extending from a dual type brake master cylinder and connected to the respective rear wheel brakes. The device is compactly formed with its essential parts housed in a single casing and can be readily mounted across the two hydraulic lines midway thereof to serve two functions, one of warning the driver of any fluid leakage possibly occurring in one or the other of the two hydraulic lines and the other of adjusting the ratio of the front to the rear wheel brake pressure for maximized overall braking efficiency. A pair of differential pistons are slidably fitted in aligned cylinder bores to define in each an input and an output hydraulic chamber communicating with each other through a normally open control valve, which is closed upon movement of the associated piston under differential pressure. Also, a balance piston is arranged between the differential pistons and movable with either of them to actuate a switch unit inserted in an electrical alarm circuit.

11 Claims, 5 Drawing Figures

FLUID PRESSURE CONTROL DEVICE WITH A FAILURE ALARM FOR A VEHICLE BRAKE SYSTEM

BACKGROUND OF THE INVENTION

This invention relates generally to brake systems for automotive vehicles of the type including a dual type brake master cylinder associated with two mutually independent hydraulic lines and more particularly to fluid pressure control devices for such brake systems which include a brake failure alarm.

As is well known, in one form of brake system of the type described, the first and second hydraulic lines, extending from the respective outlet ports of the dual type brake master cylinder, are connected to the brake chambers in respective pairs of front and rear wheels lying on the opposite sides of the vehicle. In another form, the front wheel brakes are each provided with two hydraulic chambers respectively connected with the first and second hydraulic lines, which are connected to the respective rear wheel brakes.

SUMMARY OF THE INVENTION

The present invention has for its object the provision of a fluid pressure control device with a failure alarm which is usable in vehicle brake systems of the type described and highly effective to ensure driving safety.

A further object of the present invention is to provide a fluid pressure control device of the character described which is compact in construction and easy to handle.

According to the present invention, a fluid pressure control device with a failure alarm is provided which includes means for automatically warning the driver of any fluid leakage possibly occurring in either of the two mutually independent hydraulic fluid lines $L_1$ and $L_2$ of the brake system and means for automatically adjusting the ratio of hydraulic pressure in the front wheel brakes to that in the rear wheel brakes to a prescribed value thereby to give a maximized overall braking efficiency, and in which both of said means are housed in a common casing of generally cylindrical form.

The above and other objects, features and advantages of the present invention will become apparent from the following description when taken in conjunction with the accompanying drawings.

DESCRIPTION OF THE PREFERRED EMBODIMENTS

Figure 1:
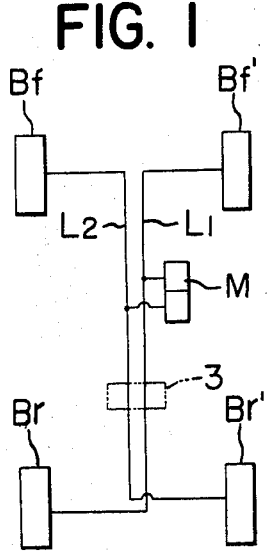
FIG. 1 is a schematic diagram illustrating the general arrangement of one preferred embodiment of the present invention.
Figure 2:
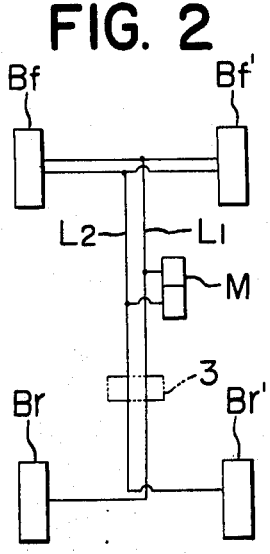
FIG. 2 is a diagram similar to FIG. 1, illustrating the general arrangement of another preferred embodiment of the invention.

In FIG. 1, there is shown a vehicle brake system embodying the present invention and which includes a first and a second hydraulic fluid line, $L_1$ and $L_2$, respectively extending from the two output ports of a dual type brake master cylinder M and connected to the respective pairs of front and rear wheel brakes, Bf', Br and Bf, Br', lying on the opposite sides of the vehicle. FIG. 2 illustrates another brake system embodying the present invention and in which each of the front wheel brakes Bf and Bf' includes two hydraulic chambers respectively connected with the first and second brake lines $L_1$ and $L_2$. In each of these figures, reference numeral 3 indicates the casing body of the device of the present invention, which is arranged across the first and second hydraulic lines $L_1$ and $L_2$ between the brake master cylinder M and the rear wheel brakes Br and Br'.

Figure 3:
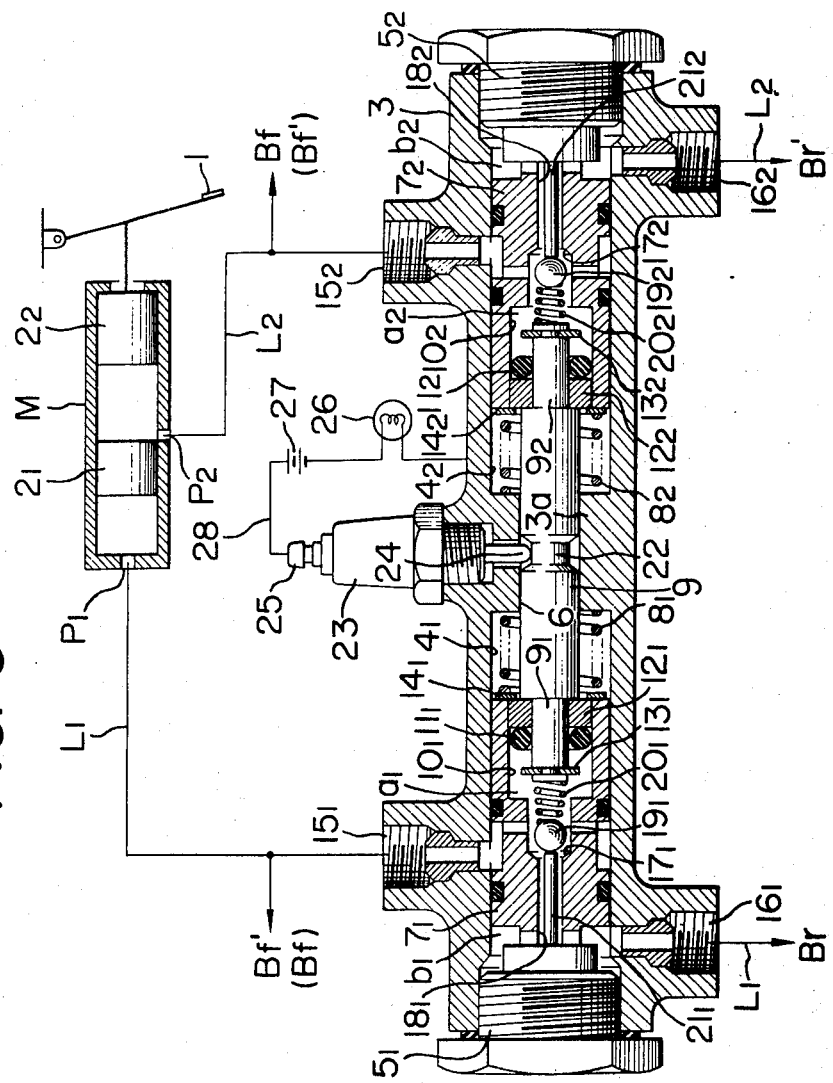
FIG. 3 is a partly schematic cross-sectional plan view of the essential parts of the device shown in FIGS. 1 and 2.

Referring to FIG. 3, the dual type brake master cylinder M is of known tandem structure, including an integral piston assembly comprised of a pair of front and rear pistons $2_1$ and $2_2$, which are operable under the action of a brake pedal 1 to feed the first and second hydraulic lines $L_1$ and $L_2$ with pressure fluid such as oil under pressure, respectively, through a first and a second outlet port $P_1$ and $P_2$ of the brake master cylinder M.

The casing 3 of the device of the present invention has defined therein a pair of axially aligned left and right cylinder bores $4_1$ and $4_2$, which are adapted to be closed at the outer end by threaded plugs $5_1$ and $5_2$, respectively. Reference numeral 3a indicates a partition wall formed in the casing to separate the cylinder bores $4_1$ and $4_2$ from each other and in which wall a bearing aperture 6 of limited diameter is formed. Accommodated in the cylinder bores $4_1$ and $4_2$ are a pair of differential pistons $7_1$ and $7_2$ of the same size and respective pressure adjusting springs $8_1$ and $8_2$ arranged to bias the pistons $7_1$ and $7_2$ axially outwardly. Also, a balance piston 9 is slidably fitted in the bearing aperture 6. The differential pistons $7_1$ and $7_2$ are formed therein with respective small stepped cylinder bores $10_1$ and $10_2$ and minor pistons $12_1$ and $12_2$ of the same diameter are slidably fitted in the larger diameter portions of the respective cylinder bores $10_1$ and $10_2$ with respective annular seals $11_1$ and $11_2$ arranged on the outside of the pistons $12_1$ and $12_2$. The balance piston 9 is formed on the opposite ends thereof with axially extending aligned stems $9_1$ and $9_2$, which are slidably fitted through the respective minor pistons $12_1$ and $12_2$ axially thereof. Abutment rings $13_1$ and $13_2$ are secured to the extremities of the respective stems $9_1$ and $9_2$ for abutting engagement with the annular, interior shoulder surface of the respective differential pistons $7_1$ and $7_2$. Seat plates $14_1$ and $14_2$ are arranged in the cylinder bores $4_1$ and $4_2$, respectively, between the differential piston $7_1$ or $7_2$ and the adjacent pressure adjusting spring $8_1$ or $8_2$ for bearing engagement with the back or inner end face of the respective minor pistons $12_1$ and $12_2$.

Further, the minor pistons $12_1$, $12_2$ and stems $9_1$, $9_2$ of the balance piston 9 define in the respective stepped cylinder bores $10_1$ and $10_2$ a first and a second input hydraulic chamber $a_1$ and $a_2$, respectively. Further, the differential pistons $7_1$ and $7_2$ define in the cylinder bores $4_1$ and $4_2$ a first and a second output hydraulic chamber $b_1$ and $b_2$, respectively, in co-operation with the threaded plugs $5_1$ and $5_2$. As illustrated, the first and second input hydraulic chambers $a_1$ and $a_2$ are in communication with the upstream portions of the first and second hydraulic lines $L_1$ and $L_2$, respectively, by way of inlet ports $15_1$ and $15_2$ formed in the wall of casing 3. The first and second output hydraulic chambers $b_1$ and $b_2$ are in communication with the downstream portions of the hydraulic lines $L_1$ and $L_2$, respectively, by way of outlet ports $16_1$ and $16_2$ formed in the wall of casing 3.

The end walls of the respective stepped cylinder bores $10_1$ and $10_2$ are formed inside thereof with valve seats $17_1$ and $17_2$, respectively, and are also formed with axial oil apertures $18_1$ and $18_2$, respectively, opening into the adjacent output hydraulic chambers $b_1$ and $b_2$. Ball valves $19_1$ and $19_2$ engageable with the respective valve seats $17_1$ and $17_2$, and springs $20_1$ and $20_2$ for biasing the ball valves into closed position are accommodated in the respective stepped cylinder bores $10_1$ and $10_2$. Extending into the oil apertures $18_1$ and $18_2$ are valve opening rods $21_1$ and $21_2$ which extend axially inwardly from the inner end faces of the respective threaded plugs $5_1$ and $5_2$. These valve opening rods $21_1$ and $21_2$ are so arranged as to hold open the respective ball valves $19_1$ and $19_2$ at the end of axial outward movement of the respective differential pistons $7_1$ and $7_2$.

The balance piston 9 is formed with an annular groove 22 in its medial portion fitted in the bearing aperture 6 in the partition wall $3a$ and a switch unit 23, including an actuator 24 normally engaged in the annular groove 22, is threadably fitted in the wall of casing 3. The switch unit 23 has normally open contacts which are closed when the switch actuator 24 is forced out of the annular groove 22 as the balance piston 9 is moved to the right or the left and, as shown, as electric circuit 28 is formed between the terminal 25 of the switch unit 24 and the casing 3, including an alarm device 26 in the form of a lamp, a buzzer or the like and a voltage supply source 27.

Description will next be made of the operation of the device described above.

Normally, when the brake master cylinder M remains inoperative, the left and right differential pistons $7_1$ and $7_2$ are in their outermost position under the initial bias of the respective pressure adjusting springs $8_1$ and $8_2$, as shown in FIG. 3, and the ball valves $19_1$ and $19_2$ are held open for fluid communication between the first input and output hydraulic chambers $a_1$ and $b_1$ and between the second input and output hydraulic chambers $a_2$ and $b_2$, respectively, through the oil apertures $18_1$ and $18_2$.

Under this situation, if the brake pedal 1 is actuated, the hydraulic output of the brake master cylinder M is fed into the entire lengths of first and second hydraulic lines $L_1$ and $L_2$ to cause the front wheel brakes Bf, Bf' and the rear wheel brakes Br, Br' to operate all at the same time. With the rise of the output fluid pressure of the brake master cylinder M, the fluid pressure in the input and output hydraulic chambers $a_1$, $a_2$, $b_1$ and $b_2$ reaches a definite level such that the pressure differential acting upon the pistons $7_1$ and $7_2$, each having opposite end faces differing in effective area from each other, causes the respective pistons $7_1$ and $7_2$ to move axially inwardly against the bias of the pressure adjusting springs $8_1$ and $8_2$. As a result, the ball valves $19_1$ and $19_2$ are seated against the respective valve seat $17_1$ and $17_2$ to close the oil apertures $18_1$ and $18_2$ so that the hydraulic pressure in the rear wheel brakes Br and Br' is reduced by an amount corresponding to the increase in volume of the first and second outlet hydraulic chambers $b_1$ and $b_2$ as resulting from the axial movement of the respective differential pistons $7_1$ and $7_2$.

Figure 4:
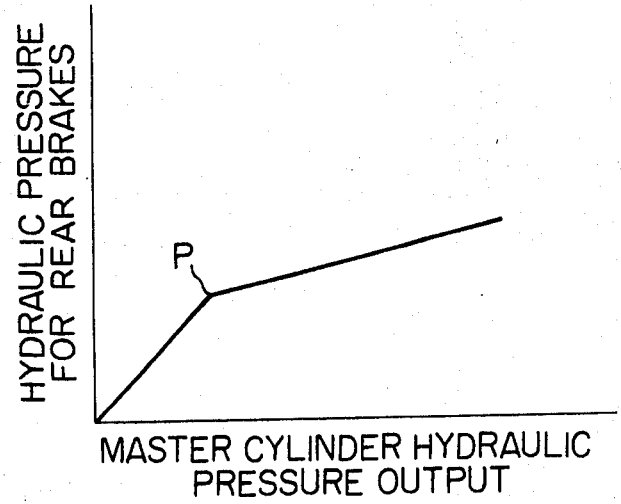
FIG. 4 is a graphic representation of the hydraulic pressure characteristics obtainable at the rear wheel brakes according to the present invention.

As the output pressure of brake master cylinder M further increases, the pressure increase in the respective input hydraulic chambers $a_1$ and $a_2$ acts to push the differential pistons at this time axially outwardly and the ball valves $19_1$ and $19_2$ are again opened to increase the pressure in the output hydraulic chambers $b_1$ and $b_2$. When this pressure reaches a definite level, it causes the differential pistons $7_1$ and $7_2$ again to operate and is accordingly reduced. With repetition of the operation described, the brake fluid pressure in each of the rear wheel brakes Br and Br' varies along the bent line in FIG. 4. The point of inflexion $p$ is determined by the initial load set on the pressure adjusting springs $8_1$, $8_2$ and the rate of pressure rise after the point of inflexion $p$ is determined by the ratio of the area of one end face of the pressure receiving pistons $7_1$, $7_2$ to that of the other end face thereof.

Figure 5:
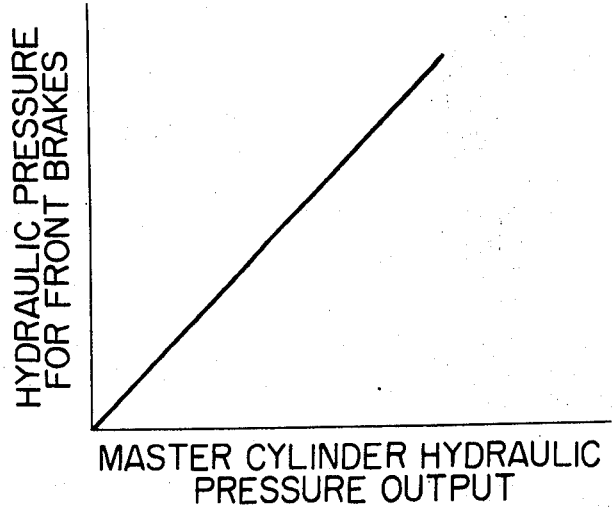
FIG. 5 is a graphic representation of the hydraulic pressure characteristics obtainable at the front wheel brakes.

On the other hand, the front wheel brakes Bf and Bf' are directly subjected to the output fluid pressure of the brake master cylinder M; that is to say, the fluid pressure in the front wheel brakes is held equal to the output pressure of the brake master cylinder M, as illustrated in the diagram of FIG. 5.

Accordingly, with the device of the present invention, the front wheel brakes Bf and Bf' can work forcefully upon the front wheels, which are required to bear an increasing downward load as the vehicle is tilted forwardly under the effect of heavy braking operation, while the rear wheel brakes Br and Br' work relatively lightly upon the rear wheels, which are more or less relieved of the downward load with the forward tilt of the vehicle. Thus, all the four wheels of the vehicle can be braked as a whole with a maximized efficiency without the danger of any skidding.

Further, in such normal braking operation described above, since the pressures in the first and second input hydraulic chambers $a_1$ and $a_2$ are held equal to each other, the balance piston 9 remains in its neutral position illustrated, with the switch actuator 24 remaining in engagement with the annular groove 22 in the medial portion of the piston 9 and the contacts of the switch unit 23 held open to maintain the alarm 26 inoperative.

However, if there exist some fluid leakage, for example, in the second hydraulic line $L_2$, the pressure in the second input hydraulic chamber $a_2$ cannot be effectively raised even when the brake master cylinder M is actuated and hence the balance piston 9 is subjected to an increased fluid pressure only on the end face of the left-hand side stem $9_1$ and thus moved to the right together with the right-hand side minor piston $12_2$ and adjacent annular seal $11_2$ until the abutment ring $13_2$ on the right-hand side stem $9_2$ is brought into abutting engagement with the annular shoulder surface of the adjacent differential piston $7_2$. Simultaneously with this, the switch actuator 24 is forced out of the annular groove 22 to close the electric circuit 28 and thus the alarm 26 is actuated. The balance piston 9, once placed in its extreme right position, remains in that position due to the frictional drag exerted by the annular seals $11_1$ and $11_2$ upon the respective stems $9_1$ and $9_2$ even after the brake master cylinder M has been released to exhaust the first input hydraulic chamber $a_1$ and accordingly the alarm 26 is kept operative until the pressure failure or leakage in the second hydraulic line L₂ is remedied.

After the failure has been remedied, the pressure in both input hydraulic chambers $a_1$ and $a_2$ is naturally raised as the brake master cylinder M is actuated so that the right-hand side minor piston $12_2$, previously moved to its extreme right position and now subject to the raised pressure in the second input and output hydraulic chambers $a_2$ and $b_2$, is moved to the left together with the annular seal $11_2$ into abutting engagement with the seal plate $14_2$, embraced between the pressure adjusting spring $8_2$ and differential pistion $7_2$, and acts through the medium of the seat plate $14_2$ to restore the balance piston 9 to its neutral position. Simultaneously with this, the switch actuator 24 is released into engagement with the annular groove 22 in the balance piston 9, thereby indicating that now no pressure failure exists in the whole hydraulic system.

In the event of a fluid leakage in the first hydraulic line $L_1$, the balance piston 9 operates in quite the same manner as described above except that its direction of operation is reversed.

It will be apparent from the foregoing description that, according to the present invention, the brake fluid pressure in the left and right rear wheel brakes Br and Br', respectively connected with the first and second mutually independent hydraulic lines $L_1$, and $L_2$, is normally reduced at a prescribed ratio with respect to that in the front wheel brakes $B_f$ and $B_f'$ so that all the four wheels of the vehicle are subjected to respective braking forces corresponding to the load levels imposed thereon upon a braking operation. Further, in cases where a fluid leakage occurs in one or the other of the two hydraulic lines $L_1$ and $L_2$, the driver is warned of such trouble without fail. In addition, since the component parts required to serve these functions are so designed as to be accommodated compactly in a single casing, such as indicated at 3, the device is highly convenient to handle and can be easily mounted on a vehicle even where only a limited space is available.

While one preferred form of the device of the present invention has been shown and described, it will be apparent to those skilled in the art that many changes and modifications may be made therein without departing from the spirit of the invention or the scope of the appended claims.

What is claimed is:

1. In a vehicle brake system of the type including a dual brake master cylinder having a first and a second independent output port and a first and a second hydraulic fluid line extending from said respective first and second output ports of said brake master cylinder and connected to the respective hydraulic fluid chambers of a pair of left and right front wheel brakes, a fluid pressure control device with a failure alarm comprising: a casing arranged across said first and second hydraulic fluid lines midway thereof and defining a pair of aligned left and right cylinder bores, a pair of left and right differential pistons slidably fitted in said respective cylinder bores, a first and a second input hydraulic chamber defined on the axially inner side of said respective differential pistons and communicating with respective upstream portions of said first and second hydraulic fluid lines, a first and a second output hydraulic chamber defined on the axially outer side of said respective differential pistons and communicating with respective downstream portions of said first and second hydraulic fluid lines, said differential pistons each having one end face exposed to the adjacent input hydraulic chamber and the other end face exposed to the adjacent output hydraulic chamber and larger in area than said one end face, a fluid control valve provided for fluid communication between each of said input hydraulic chambers and the adjacent output hydraulic chamber, means secured to said casing for opening each said fluid control valve upon axial movement to the outermost position of the associated differential piston and to close said valve upon axially inward movement thereof, a balance piston slidably fitted at the opposite ends in said first and second input hydraulic chambers and slidable from a neutral position under a pressure differential occurring between said input hydraulic chambers, and a switch unit operable in response to the sliding movement of said balance piston from the neutral position to actuate an external alarm.

2. A vehicle brake system as claimed in claim 1 wherein each said differential piston has a bore therein establishing communication between the adjacent input and output chambers, said fluid control valve comprising a valve member for selectively opening and closing said bore in response to the axial movement of the differential piston.

3. A vehicle brake system as claimed in claim 2 wherein said valve member is a ball valve.

4. A vehicle brake system as claimed in claim 2 comprising spring means acting on said valve member and the balancing piston to urge said valve member to close said bore.

5. A vehicle brake system as claimed in claim 2 wherein said means for opening each valve comprises a stem fixed to the casing and extending through the associated bore of a respective differential piston to engage the respective valve member and urge the same to open said bore.

6. In a vehicle brake system of the type including a dual brake master cylinder having a first and a second independent output port and a first and a second hydraulic fluid line extending from said respective first and second output ports of said brake master cylinder and connected to the respective hydraulic fluid chambers of a pair of left and right front wheel brakes, a fluid pressure control device with a failure alarm comprising: a casing arranged across said first and second hydraulic fluid lines midway thereof and defining therein a pair of aligned left and right cylinder bores on opposite sides of a partition wall thereof, a pair of left and right differential pistons slidably fitted in said respective cylinder bores and each having a small cylinder bore formed therein on the axially inner side thereof, a pair of left and right minor pistons slidably accommodated in said respective small cylinder bores of said differential pistons in fluid-tight relation therewith, a first and a second input hydraulic chamber respectively defined by the interior surfaces of said differential piston bores and one end face of said minor pistons and communicating with respective upstream portions of said first and second hydraulic fluid lines, a first and a second output hydraulic chamber defined on the axially outer side of said respective differential pistons and communicating with respective downstream portions of said first and second hydraulic fluid lines, spring means acting to resiliently bias said respective differential pistons in axially outward directions, means for defining innermost limit positions of said minor pistons in their axial movements within said differential piston bores, said differential pistons each having one end face exposed to the adjacent input hydraulic chamber and the other end face exposed to the adjacent output hydraulic chamber and larger in area than said one end face, a fluid control valve provided for fluid communication between each of said input hydraulic chambers and the adjacent output hydraulic chamber and adapted to open upon axial movement to the outermost position of the associated differential piston and close upon axially inward movement thereof, a balance piston slidably carried by said partition wall of said casing and having a pair of left and right axial stems formed on the opposite ends so as to extend therefrom through said respective minor pistons to said first and second input hydraulic chambers, said balance piston being held in a neutral position under the centering action of said minor pistons in the normal operating condition of said brake system and being slidable from the neutral position under a pressure differential occurring between said input hydraulic chambers, and a switch unit operable in response to the sliding movement of said balance piston from the neutral position to actuate an external alarm.

7. A vehicle brake system as claimed in claim 6 comprising means secured to said casing for opening each said fluid control valve upon axial movement of the associated differential piston to its outmost position and for closing said valve upon axially inward movement of said differential piston.

8. A vehicle brake system as claimed in claim 7 wherein each said differential piston has a bore therein establishing communication between the adjacent input and output chambers, said fluid control valve comprising a valve member for selectively opening and closing said bore in response to the axial movement of the differential piston.

9. A vehicle brake system as claimed in claim 8 wherein said valve member is a ball valve.

10. A vehicle brake system as claimed in claim 8 comprising spring means acting on said valve member and the associated stem of the balance piston to urge said valve member to close said bore in the associated differential piston.

11. A vehicle brake system as claimed in claim 8 wherein said means for opening each valve comprises a stem fixed to the casing and extending through the associated bore of a respective differential piston to engage the respective valve member and urge the same to open said bore.

* * * * *